(12) United States Patent
Masuta

(10) Patent No.: US 7,387,233 B2
(45) Date of Patent: Jun. 17, 2008

(54) RFID CARD ISSUING SYSTEM

(75) Inventor: Toshimichi Masuta, Tsugaru (JP)

(73) Assignee: Renesas Technology Corp., Tokyo (JP)

( * ) Notice: Subject to any disclaimer, the term of this patent is extended or adjusted under 35 U.S.C. 154(b) by 234 days.

(21) Appl. No.: 10/560,524

(22) PCT Filed: Dec. 12, 2004

(86) PCT No.: PCT/JP2004/018636

§ 371 (c)(1),
(2), (4) Date: Dec. 13, 2005

(87) PCT Pub. No.: WO2006/064545

PCT Pub. Date: Jun. 22, 2006

(65) Prior Publication Data

US 2007/0251993 A1   Nov. 1, 2007

(51) Int. Cl.
    *G06F 17/00* (2006.01)
(52) U.S. Cl. .................................. 235/375
(58) Field of Classification Search ............ 235/375, 235/380
See application file for complete search history.

(56) References Cited

U.S. PATENT DOCUMENTS 5,814,796 A * 9/1998 Benson et al. ............ 235/375
5,889,941 A * 3/1999 Tushie et al. .................. 726/26
5,898,165 A * 4/1999 Kinugasa et al. .......... 235/492
5,949,046 A * 9/1999 Kenneth et al. ............ 235/380
6,769,608 B2 * 8/2004 Nishimura .................. 235/380

FOREIGN PATENT DOCUMENTS

| JP | 06-044265 | 2/1994 |
| JP | 2000-177283 | 6/2000 |
| JP | 2002-185246 | 6/2002 |
| JP | 2002-197425 | 7/2002 |
| JP | 2002-207984 | 7/2002 |
| JP | 2002-211170 | 7/2002 |
| JP | 2002-279356 | 9/2002 |
| JP | 2003-132330 | 5/2003 |
| JP | 2003-140548 | 5/2003 |
| JP | 2004-245870 | 9/2004 |

* cited by examiner

*Primary Examiner*—Jamara Franklin
(74) *Attorney, Agent, or Firm*—Antonelli, Terry, Stout & Kraus, LLP.

(57) ABSTRACT

In this REID card issuing system, manual operations are required only in two steps of: inputting personal information of an RFID card holder to register it in database; and pushing a shutter button of a camera when a photograph is being taken. Also, software controls are employed for the steps of: copying an image file of a computer COM4 from the camera CAM, changing the file name to a suitable name, and registering the name in the database to associate it with the personal information; printing the image file and personal information on a new card NC; and reading an ID number from an inlet stuck to a rear surface of the new card NC during the printing and registering the ID number in the database to associate it with the personal information and image file. Therefore, it is possible to reduce the issuing time and simplify the issuing process of the RFID card.

7 Claims, 17 Drawing Sheets

RFID CARD ISSUING SYSTEM

TECHNICAL FIELD

The present invention relates to an RFID (Radio Frequency IDentification) card issuing system. More particularly, it relates to a technology effectively applied to an operation process relating to an issuance of an RFID card.

BACKGROUND ART

Japanese Patent Application Laid-Open Publication No. 2003-132330 (patent document 1) discloses an RFID label printer in which antennas of a reader/writer of the RFID label printer are disposed along a label carrier on an upstream side and a downstream side of a printing part, so that RFID labels in which an electrical read/write error occurs after the printing by a thermal head are detected and the detection is notified.

Further, Japanese Patent Application Laid-Open Publication No. 2002-211170 (patent document 2) discloses a delivery label in which a sticking label and a delivery label-cum-receipt label are provided in parallel on a front surface of an adhesion base material having an adhesive agent coated with a release paper on a rear surface thereof so that respective delivery information writing surfaces are exposed, the delivery label-cum-receipt label is provided so as to be detachable to the adhesion base material, and an IC tag having a non-contact type IC chip provided at a position where the writing of the delivery information is not hindered and a rewrite layer formed on its front surface is detachably provided, whereby the printing by a printer can be executed to the delivery label provided with the IC tag.

Further, Japanese Patent Application Laid-Open Publication No. 2004-245870 (patent document 3) discloses a technology for continuously forming identification labels from raw labels by feeding a single carrier tape in which a plurality of raw labels embedded with the RFID are laminated so as to be peelable, reading attribute information relating to a printing condition of the raw label from the RFID, executing a printing of an image on each of the raw labels based on the read attribute information, and writing the identification information of the identification label on each of the RFID.

Further, Japanese Patent Application Laid-Open Publication No. 2002-207984 (patent document 4) discloses a printer provided with means for determining a level of a printing content, means for sticking an RFID tag to a label, means for performing the printing on the label, and means for encoding to the RFID tag, and it also discloses a system and a printer which determine the level of the printing content inputted by a host system, stick the RFID tag based on a set value of the level, print on the label and encode to the RFID tag if the RFID tag is stuck, thereby sticking the RFID tags only to the necessary labels without wasting the expensive RFID tags.

Further, Japanese Patent Application Laid-Open Publication No. 2003-140548 (patent document 5) discloses a technology for executing the communication with the RFID tag and the printing, by calculating a feeding speed of the continuous label paper based on a printing condition or a communication condition or both thereof and feeding the continuous label paper at the calculated feeding speed, in the printer provided with means for printing information on a front surface of a continuous label paper to which RFID tags are attached and means for executing a communication with the RFID tag attached to the continuous label paper and writing the information.
Patent Document 1: Japanese Patent Laid-Open Application No. 2003-132330
Patent Document 2: Japanese Patent Laid-Open Application No. 2002-211170
Patent Document 3: Japanese Patent Laid-Open Application No. 2004-245870
Patent Document 4: Japanese Patent Laid-Open Application No. 2002-207984
Patent Document 5: Japanese Patent Laid-Open Application No. 2003-140548

PROBLEM TO BE SOLVED BY THE INVENTION

The non-contact type RFID card is an ID card in which a desired data is stored in a memory circuit in a semiconductor chip (hereinafter, simply referred to as a chip) and the data is read by using a microwave. Since the data is stored in the memory circuit in the chip, the RFID card has an advantage that a large capacity data can be stored in comparison with the ID card utilizing a bar code. Further, the data stored in the memory circuit has an advantage that an unfair interpolation is more difficult in comparison with the data stored in the bar code.

The inventor of the present invention has examined a system of issuing an RFID card. In this examination, the inventor of the present invention has found the following problems.

More specifically, in the system for issuing the RFID card examined by the inventor of the present invention, the RFID card is issued through the following steps, that is, (a) a step of taking an individual digital photograph and acquiring an image data, (b) a step of transferring the image data (file) obtained in the step (a) to a predetermined folder in a disk drive of a computer and changing a file name of the image data if necessary, (c) a step of inputting personal information such as a name, an affiliation and the like to register them in the database, (d) a step of inputting the file name of the image data to register it in the database so as to associate it with the personal information, (e) a step of inputting an ID number of an electronic tag to register it in the database so as to associate it with the personal information and the file name of the image data, (f) a step of reading the personal information and the file name of the image data from the database and printing the personal information and the image data on a main surface of a card, and (g) a step of sticking the electronic tag to a rear surface of the card after the step (f).

In order to execute the file transfer step in the step (b) among the steps (a) to (h), it is necessary that a user executing this transfer process understands a concept on operating the computer such as the drive, the folder and the like. Further, there is a risk that the user mistakes a transfer destination of the file or mistakes the input at the time of changing the file name. Accordingly, there exists a problem that an operator is limited.

Further, in the step (d) and the step (e), since it is necessary to input the file name of the image data or the ID number of the electronic tag, there is a risk of input error. In particular, since the number of patterns of the ID number of the electronic tag is increased to thirty-two digits or the like by utilizing a hexadecimal notation, there exists a problem that an input mistake occurs frequently.

Further, in the step (h) mentioned above, there is a risk that an incorrect electronic tag is stuck to the printed card.

Further, since the step (h) mentioned above is included in the step of issuing the RFID card, there exists a problem that the reduction of an issuing time of the RFID card is hindered.

Further, since the number of the steps is increased by sequentially executing the steps (a) to (h) mentioned above, the time until the RFID card is issued becomes too long, and there exists a problem that it is difficult to issue the card immediately.

An object of one typical invention disclosed in this application is to provide a system which can easily issue an RFID card.

Further, another object of one typical invention disclosed in this application is to provide a technology for reducing an issuing time of the RFID card.

MEANS FOR SOLVING THE PROBLEM

The typical ones of the inventions disclosed in this application will be briefly described as follows.

An RFID card issuing system according to the present invention comprises: data input means; data storing means; photographing means; ID number reading means; a database; system software; image processing software; and card printing means provided with a card in which an electronic tag is previously stuck to a rear surface and executing a printing to a main surface of the card, and the system performs:

(a) a step of inputting personal information of a person whose personal information is registered in the database by the data input means, and registering the personal information in the database by the system software;

(b) a step of acquiring an image data by taking a photograph of the person by the photographing means, thereafter acquiring the image data in a folder which stores the image data provided in the data storing means by driving the image processing software by means of the system software, applying a predetermined file name to the image data, registering the file name in the database, and associating the file name with the personal information;

(c) a step of reading the personal information of the person and the file name of the image data from the database by the system software to send them to the printing means, printing the personal information and the image data on the main surface of the card by the printing means, and issuing an RFID card; and (d) a step of reading an ID number of the electronic tag from the electronic tag on the rear surface of the card by the ID number reading means, registering the ID number in the database by the system software, and associating the ID number with the file name and the personal information.

EFFECT OF THE INVENTION

The effects obtained by typical aspects of the present invention will be briefly described below.

(1) Since it is possible to largely reduce the number of manual operation steps in the issuing process of the RFID card, it is possible to simplify the issuing process of the RFID card.

(2) Since it is possible to largely reduce the number of manual operation steps in the issuing process of the RFID card, it is possible to largely reduce the time required for issuing the RFID card.

BRIEF DESCRIPTIONS OF THE DRAWINGS

BEST MODE FOR CARRYING OUT THE INVENTION

Figure 1:
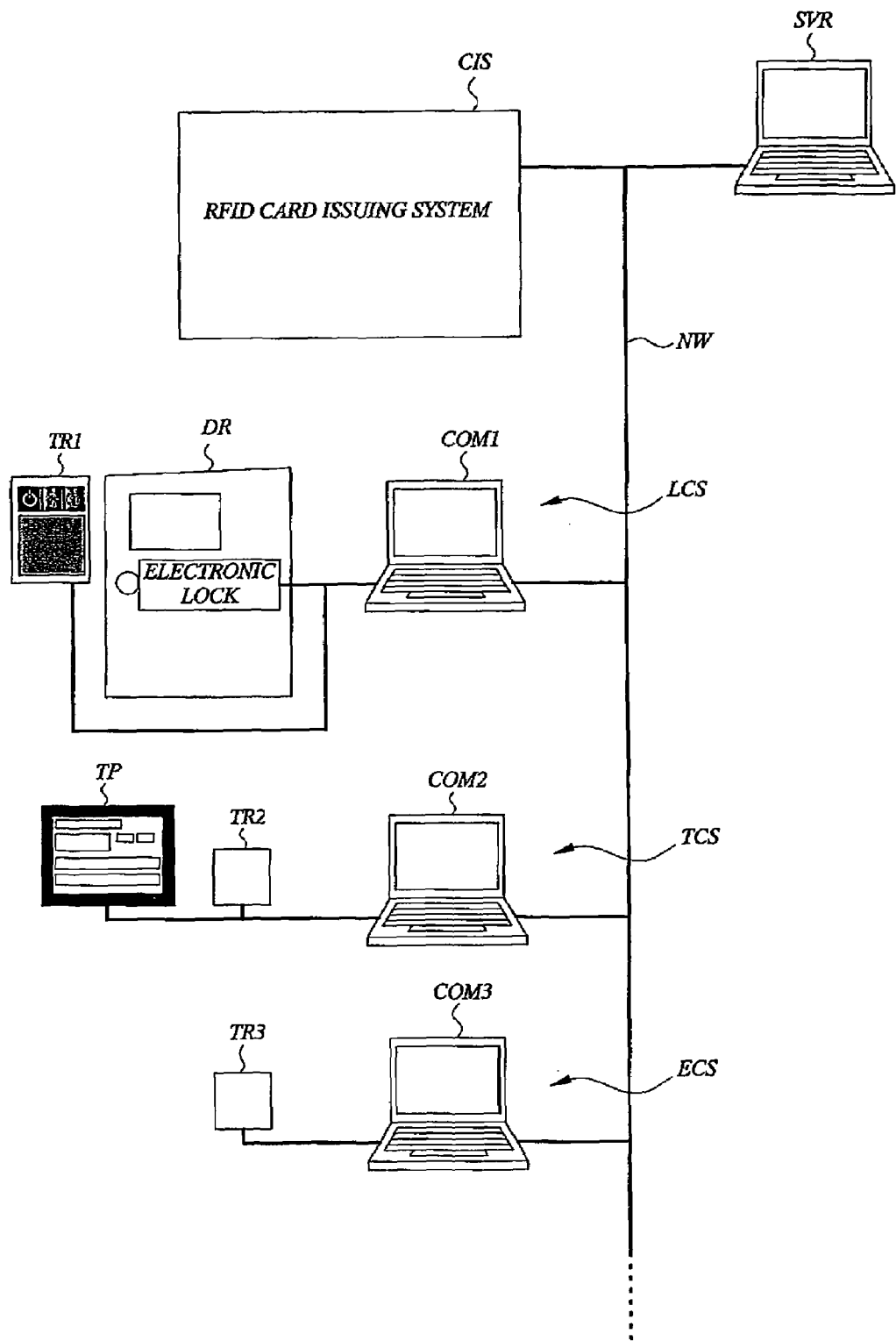
FIG. 1 is an explanatory view showing an example of a security management system including an RFID card issuing system according to one embodiment of the present invention.

Before the description of the present invention in detail, meanings of the terms in the present invention will be described as follows.

RFID means a mechanism for identifying and managing a human and an article on the basis of a micro radio chip. A data is stored in a tag, which is excellent in an environment resistance and has a size of about several cm, and it communicates with a reader through an electric wave and an electromagnetic wave. There exists a tag, which can be semi-permanently utilized with no battery on the basis of a technology of a non-contact power transfer from an antenna side. The tag has various shapes such as a label type, a card type, a coin type, a stick type and the like and selects the shape in accordance with an intended use. A communication distance is set from about several mm to several m and is selected in accordance with the intended use.

An electronic tag means a tag in which a communication function and a data rewriting function are provided in a chip of several mm or smaller. The electronic tag is called as a wireless tag or an IC tag and can execute a highly advanced and more complicated information processing by being attached to a commercial product.

An inlet means a basic product form in a state where the IC chip is mounted to a metal coil (antenna), and the metal coil and the IC chip are in a bared state.

A dipole antenna means a structure obtained by combining two quarter wavelength conductor rods, and it forms a half wavelength conductor by combining the two quarter wavelength conductor rods.

A monopole antenna means a structure composed of a quarter wavelength conductor rod and can be recognized as a half cut of the dipole antenna.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of an element (including number of pieces, values, amount, range, and the like), the number of the element is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. This condition is also applicable to the numerical value and the range described above.

Also, components having the same function are denoted by the same reference symbols throughout the drawings for describing the embodiments, and the repetitive description thereof is omitted.

Also, in the drawings used in the embodiments, hatching is used in some cases even in a plan view so as to make the drawings easy to see.

The embodiments of the present invention will be described below in detail with reference to the drawings.

FIG. 1 shows an example of a security management system including an RFID card issuing system according to this embodiment.

As shown in FIG. 1, the security management system mentioned above is used for a lock management system LCS, a time card management system TCS, an entry and exit management system ECS and the like, and it is composed of an RFID card issuing system CIS and a computer SVR for a server which operates a system software, and the like. The computer SVR for the server includes a database for accumulating and managing various data. Each of the systems and the computer SVR are electrically connected via a predetermined network line NW such as an in-house line or the like. An electronic tag is stuck to an RFID card issued by the security management system and used therein, and the electronic tag is provided with a chip which transmits a specific ID number. In this embodiment, a ROM (Read Only Memory) type memory is used as the chip, and an interpolation of the information such as the ID number or the like is difficult.

The lock management system LCS is composed of a lock state management computer COM1, a door DR having an electronic lock, an electronic tag reader TR1, and the like, and they are electrically connected to each other via a predetermined network line. The electronic lock is locked and unlocked in accordance with an electronic operation from the computer COM1, and the computer COM1 monitors a locking state or an unlocking state of the electronic lock. The electronic tag reader TR1 is provided with an indicator lamp which indicates the locking and the unlocking. When moving the RFID card close to the electronic tag reader TR1 to make the electronic tag reader TR1 read the ID number of the electronic tag stuck to the RFID card, the computer COM1 refers to the database in the computer SVR to search the ID number in the database. If the ID number is found in the database, the computer COM1 sends a signal to the electronic lock of the door DR to lock or unlock the electronic lock.

The time card management system TCS is composed of a time card management computer COM2, an electronic tag reader TR2, a touch panel TP and the like, and they are electrically connected to each other via a predetermined network line. The computer COM2 manages an entry time and an exit time of an RFID card holder and the like. The RFID card holder can input a record of his or her entry and exit in the computer COM2 by touching the touch panel TP. When moving the RFID card close to the electronic tag reader TR2 to make the electronic tag reader TR2 read the ID number of the electronic tag stuck to the RFID card, the computer COM2 refers to the database in the computer SVR to search the ID number in the database. If the ID number is found in the database, the computer COM2 displays personal information such as a name, an affiliation and the like of a person corresponding to the ID number on the touch panel, waits for an input from the RFID card holder, and records the inputted information in accordance with the input from the RFID card holder.

The entry and exit management system ECS is composed of an entry and exit management computer COM3, an electronic tag reader TR3 and the like, and they are electrically connected to each other via a predetermined network line. The computer COM3 manages a status of the entry or the exit of the RFID card holder. When the RFID card holder moves the RFID card close to the electronic tag reader TR3 to make the electronic tag reader TR3 read the ID number of the electronic tag stuck to the RFID card, the computer COM3 refers to the database in the computer SVR to search the ID number in the database. If the ID number is found in the database, the computer COM3 changes the status of the entry or the exit of the RFID card holder.

According to the lock management system LCS, the time card management system TCS and the entry and exit management system ECS mentioned above, it is possible to prevent the entry of the persons other than the RFID card holder.

Figure 2:
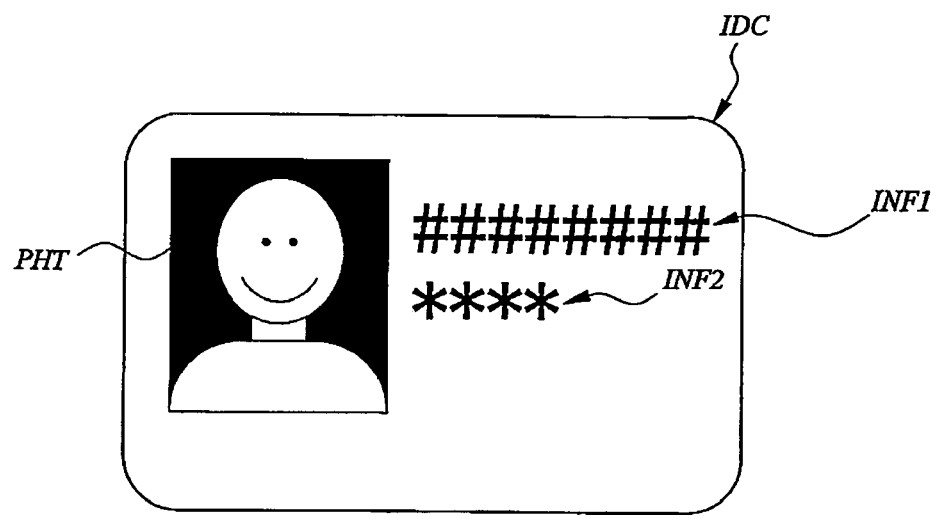
FIG. 2 is a plan view showing a main surface of an RFID card issued by the RFID card issuing system according to one embodiment of the present invention.
Figure 3:
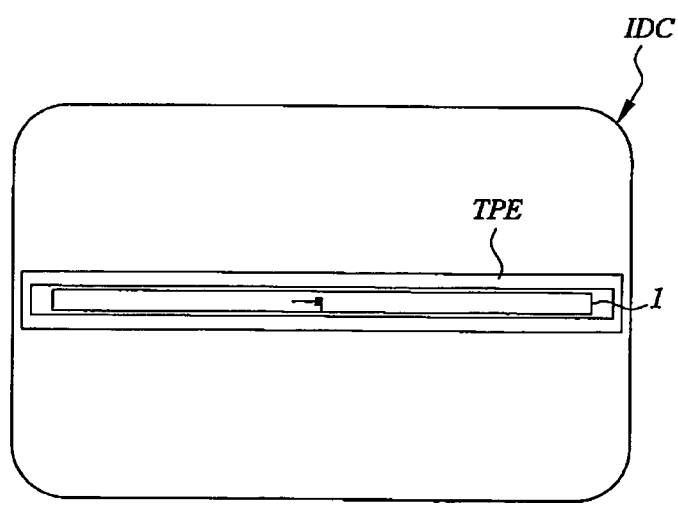
FIG. 3 is a plan view showing a rear surface of the RFID card issued by the RFID card issuing system according to one embodiment of the present invention.

FIG. 2 is a plan view showing a main surface of the RFID card IDC issued by the RFID card issuing system CIS shown in FIG. 1, and FIG. 3 is a plan view showing a rear surface of the RFID card IDC.

A photograph PHT of the holder of the RFID card IDC, personal information INF1, INF2 such as an affiliation and a name of the holder of the RFID card IDC, and the like are printed on the main surface of the RFID card IDC.

An electronic tag inlet 1 is stuck to the rear surface of the RFID card IDC by a tape TPE. As mentioned above, in the chip attached to the electronic tag, the data writing circuit is cut by a burn-out means using a laser beam or the like and the chip is composed of a ROM type memory, and thus, the interpolation of the information such as the ID number and the like is difficult.

Figure 4:
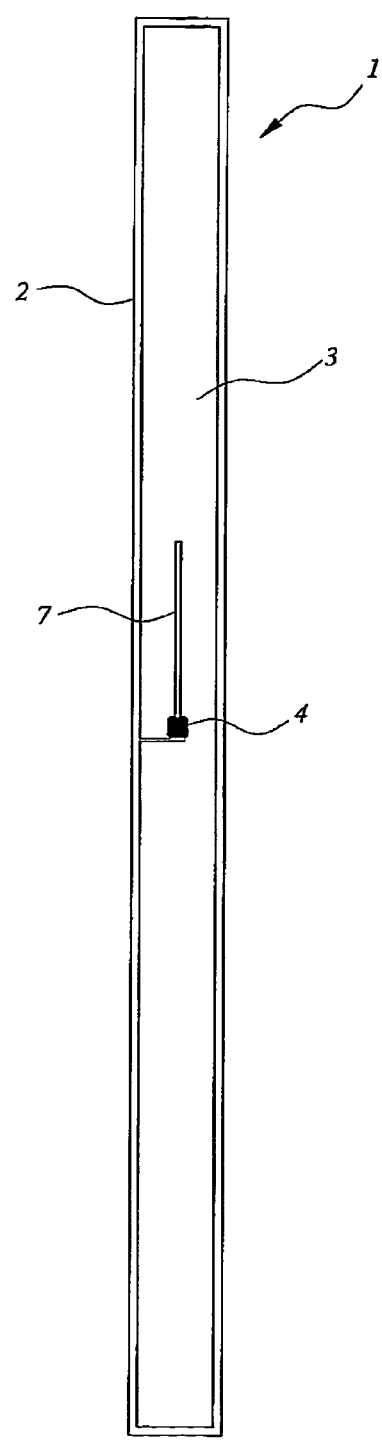
FIG. 4 is a plan view (front surface side) showing an inlet for an electronic tag stuck to the RFID card issued by the RFID card issuing system according to one embodiment of the present invention.
Figure 5:
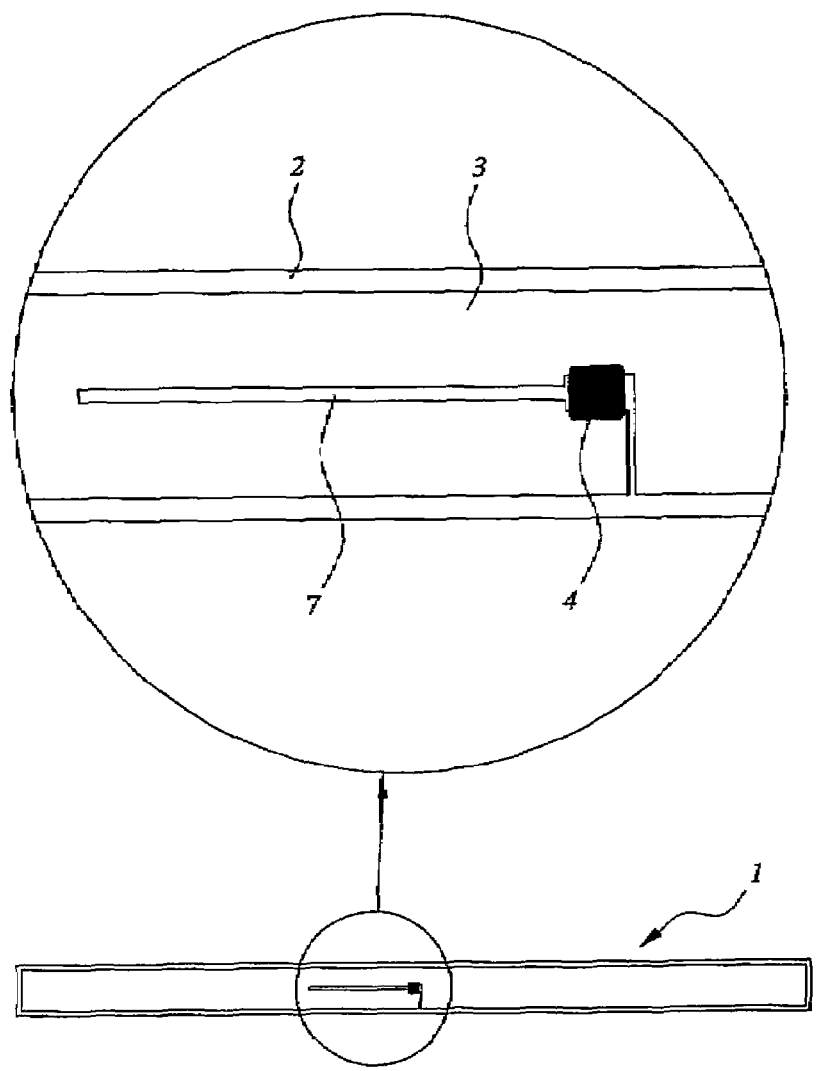
FIG. 5 is an enlarged plan view showing a part of FIG. 4.
Figure 6:
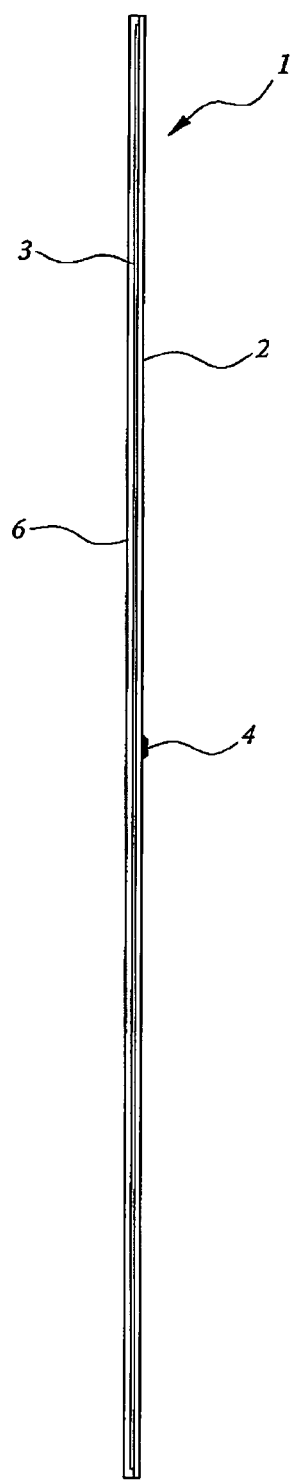
FIG. 6 is a side view showing the inlet for the electronic tag stuck to the RFID card issued by the RFID card issuing system according to one embodiment of the present invention.
Figure 7:
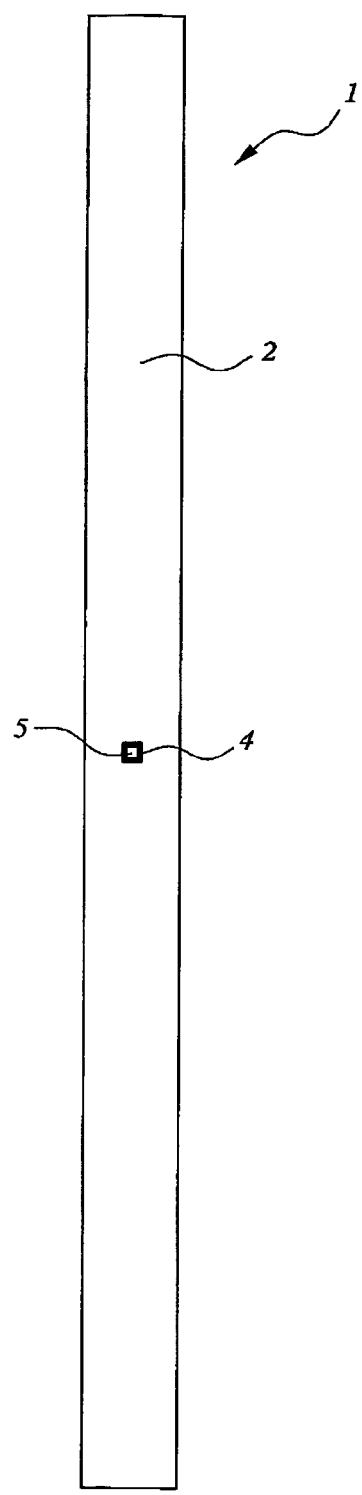
FIG. 7 is a plan view (rear surface side) showing the inlet for the electronic tag stuck to the RFID card issued by the RFID card issuing system according to one embodiment of the present invention.
Figure 8:
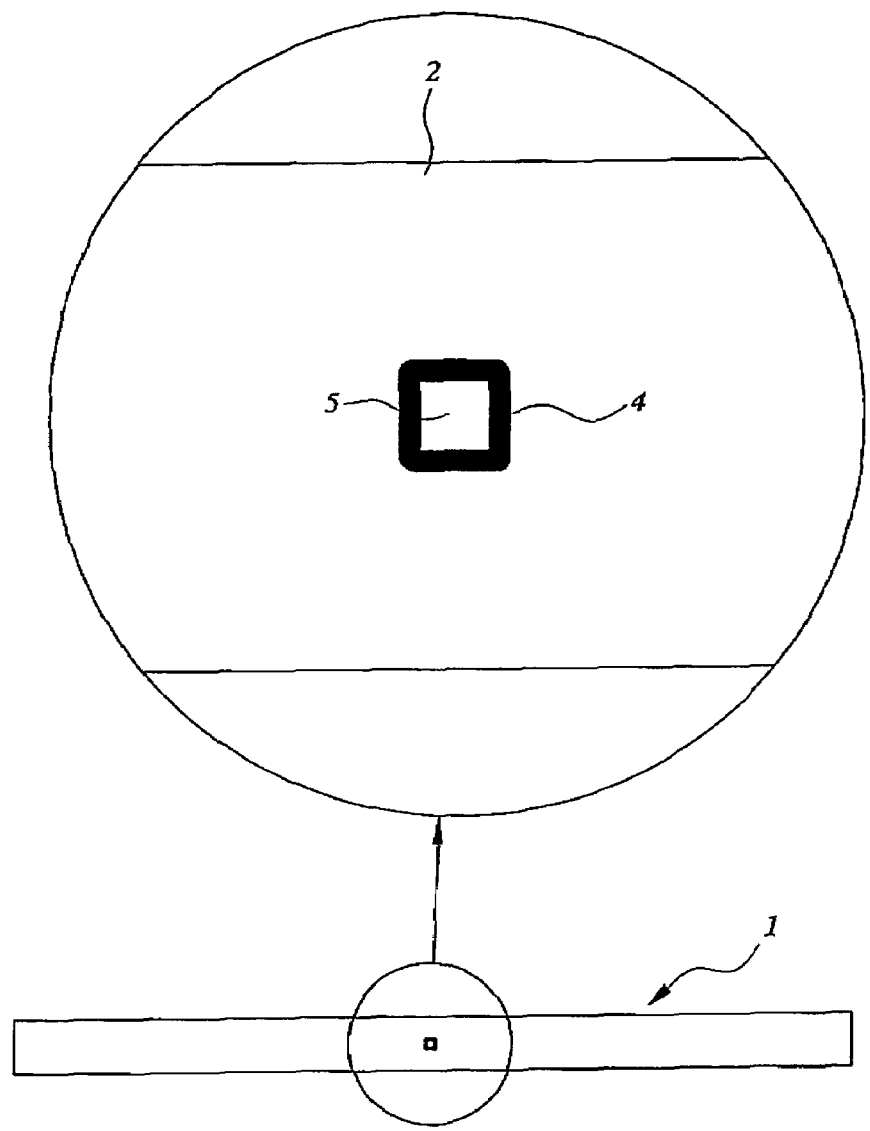
FIG. 8 is an enlarged plan view showing a part of FIG. 7.

FIG. 4 is a plan view (on a front surface side) showing an electronic tag inlet according to this embodiment, FIG. 5 is an enlarged plan view showing a part of FIG. 4, FIG. 6 is a side view showing the electronic tag inlet according to this embodiment, FIG. 7 is a plan view (on a rear surface side) showing the electronic tag inlet according to this embodiment, and FIG. 8 is an enlarged plan view showing a part of FIG. 7.

The electronic tag inlet (hereinafter, simply referred to as inlet) 1 according to this embodiment forms a main portion of a non-contact type electronic tag provided with an antenna for receiving a microwave. The inlet 1 is provided with an antenna 3 made of a metal foil of Cu, Al or the like and bonded to one surface of an elongated rectangular insulating film 2 and a chip 5 connected to the antenna 3 in a state where a front surface and side surfaces thereof are sealed with a potting resin 4. A cover film 6 for protecting the antenna 3 and the chip 5 is laminated on one surface (a surface on which the antenna 3 is formed) of the insulating film 2 according to need.

A length of the antenna 3 along a longitudinal direction of the insulating film 2 is, for example, 56 mm and is optimized so as to effectively receive a microwave having a frequency of 2.45 GHz. Further, a width of the antenna 3 is 3 mm and is optimized so as to achieve both of downsizing and strength of the inlet 1.

An L-shaped slit 7 having one end reaching an outer edge of the antenna 3 is formed in an approximately center portion of the antenna 3, and the chip 5 sealed with the potting resin 4 is mounted in a middle portion of the slit 7.

Figure 9:
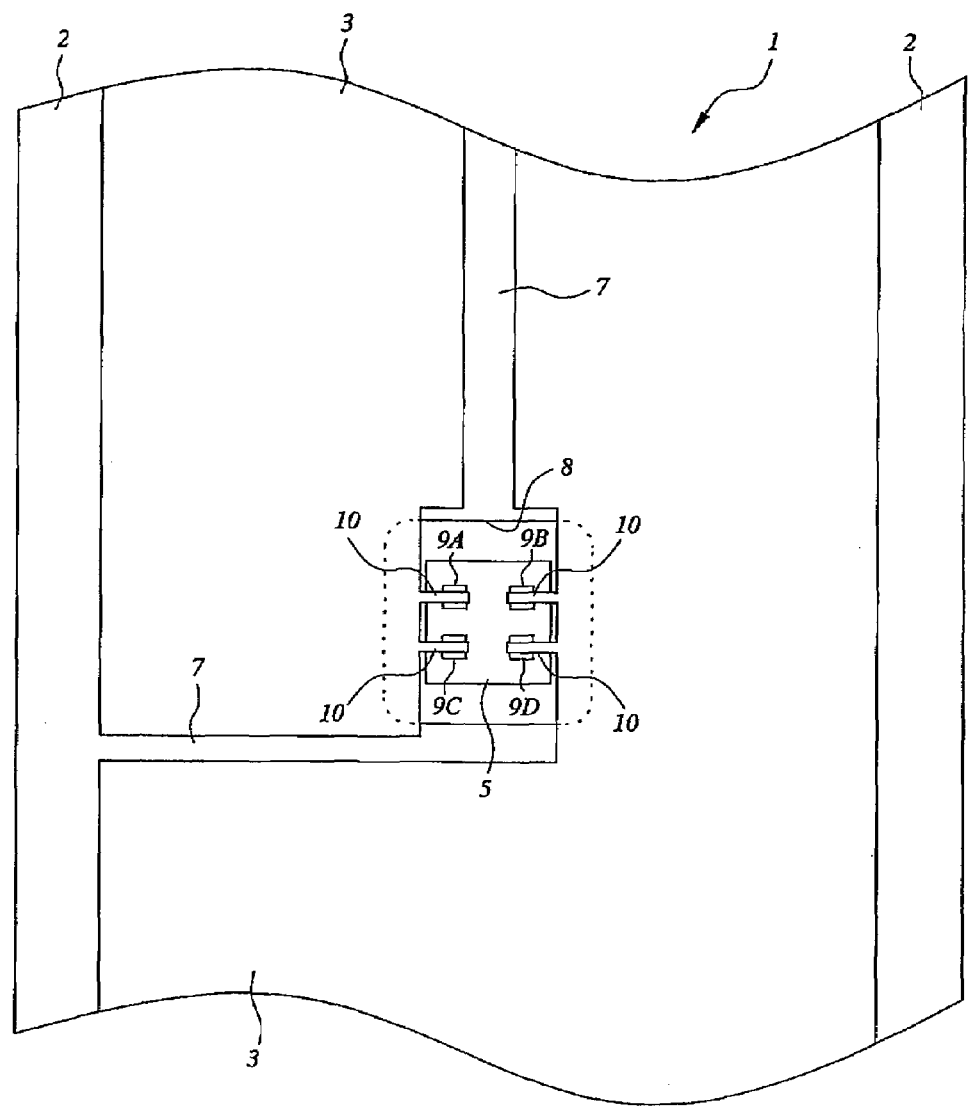
FIG. 9 is an enlarged plan view (front surface side) of a main portion of the inlet for the electronic tag stuck to the RFID card issued by the RFID card issuing system according to one embodiment of the present invention.
Figure 10:
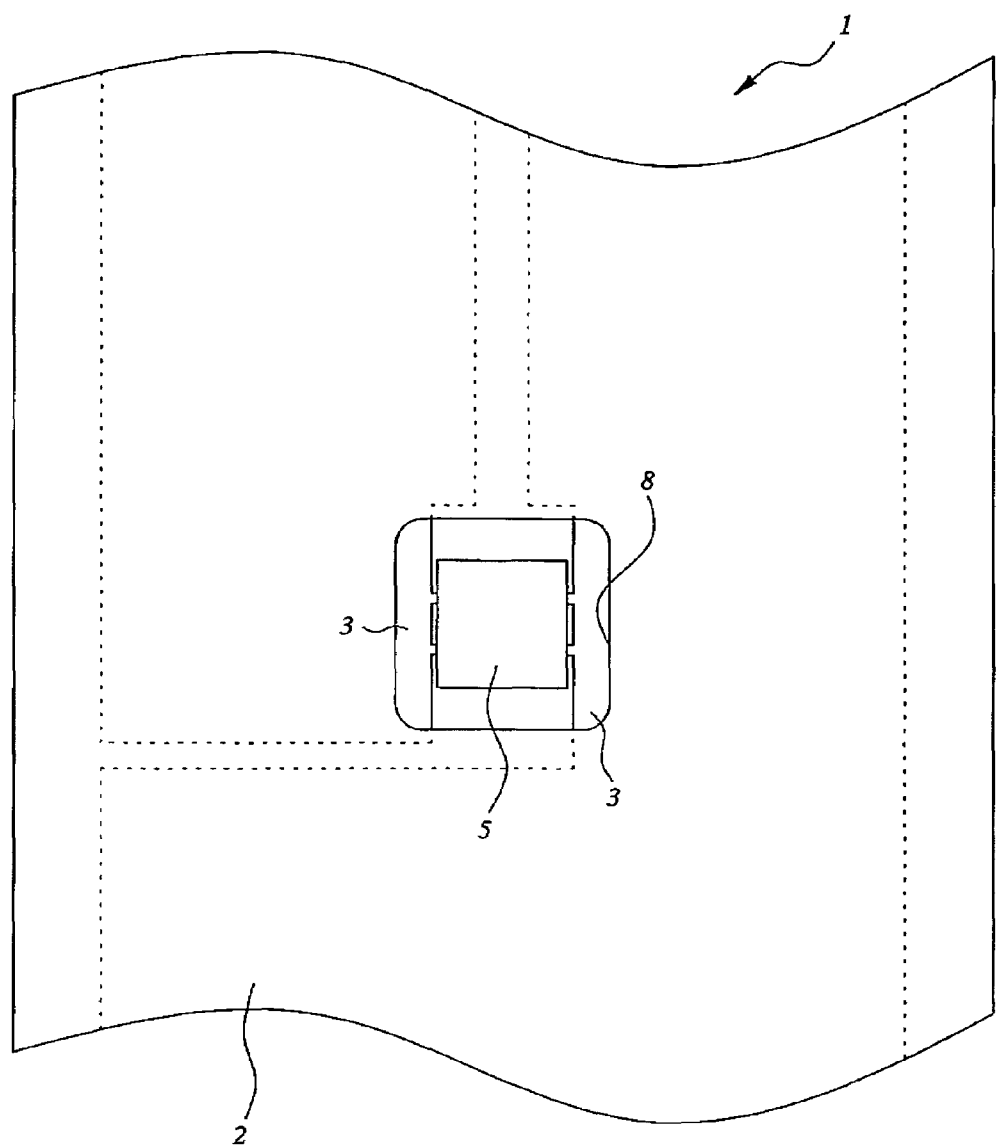
FIG. 10 is an enlarged plan view (rear surface side) of a main portion of the inlet for the electronic tag stuck to the RFID card issued by the RFID card issuing system according to one embodiment of the present invention.

FIG. 9 and FIG. 10 are plan views showing a portion near a center portion of the antenna 3 in which the slit 7 is formed, in an enlarged manner, in which FIG. 9 shows a front surface side of the inlet 1 and FIG. 10 shows a rear surface side thereof, respectively. In this case, an illustration of the potting resin 4 sealing the semiconductor chip 5 and the cover film 6 is omitted in these drawings.

As illustrated, a device hole 8 formed by punching a part of the insulating film 2 is formed in a middle portion of the slit 7, and the chip 5 is disposed at a center portion of the device hole 8. Dimensions of the device hole 8 are, for example, length×width=0.8 mm×0.8 mm, and dimensions of the chip 5 are length×width=0.48 mm×0.48 mm.

As shown in FIG. 9, for example, four Au bumps 9A, 9B, 9C and 9D are formed on a main surface of the chip 5. Further, a lead 10 integrally formed with the antenna 3 and having one end extending to an inner side of the device hole 8 is connected to each of the Au bumps 9A, 9B, 9C and 9D.

Two leads 10 of these four leads 10 extend to an inner side of the device hole 8 from one of two antennas 3 divided by the slit 7 and are electrically connected to the Au bumps 9A and 9C of the chip 5. Further, the remaining two leads 10 extend to the inner side of the device hole 8 from the other of the antenna 3 and are electrically connected to the Au bumps 9B and 9D of the chip 5.

Figure 11:
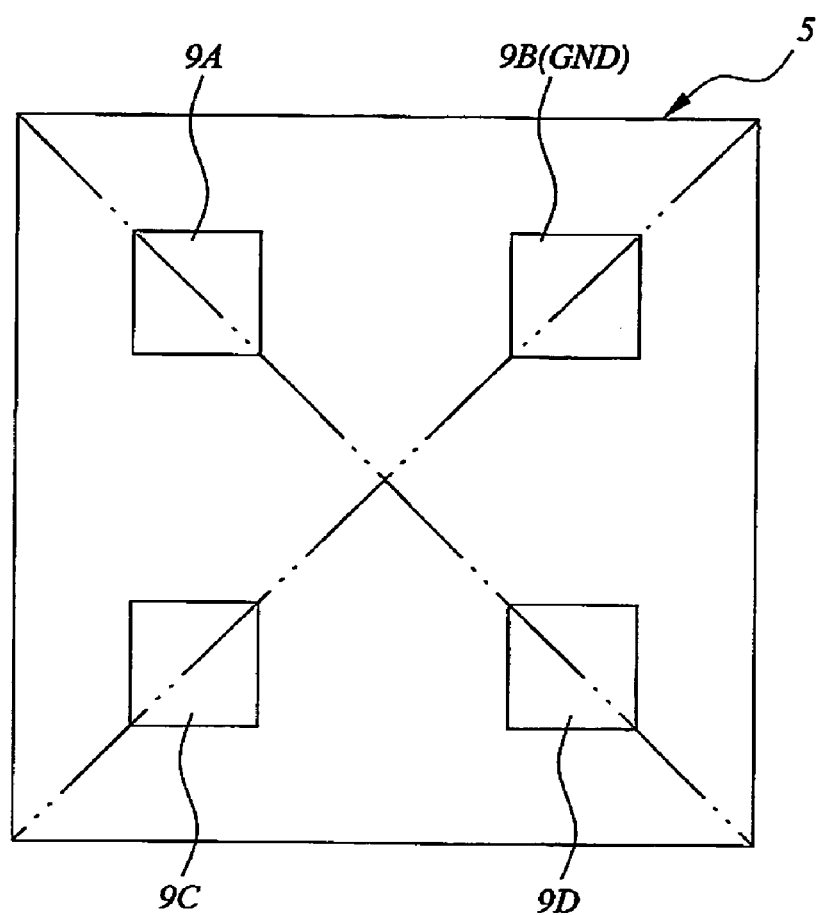
FIG. 11 is a plan view of a chip mounted on the inlet for the electronic tag stuck to the RFID card issued by the RFID card issuing system according to one embodiment of the present invention.
Figure 12:
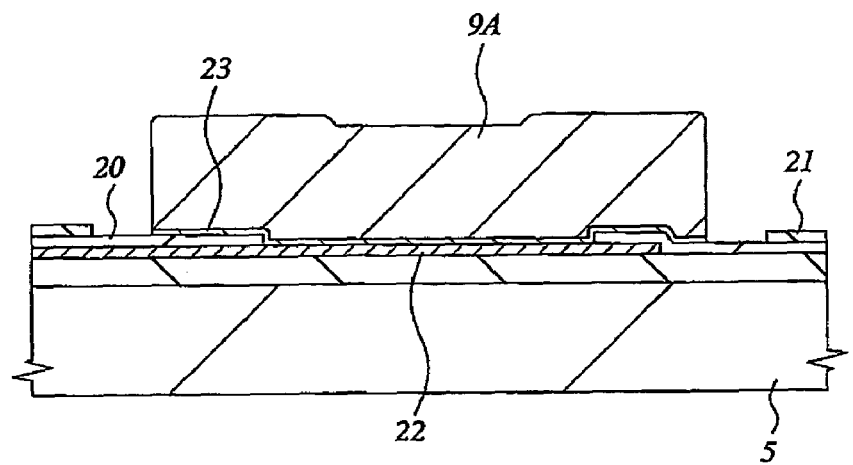
FIG. 12 is a cross-sectional view of a bump electrode formed on a main surface of the chip shown in FIG. 11 and a portion near the bump electrode.
Figure 13:
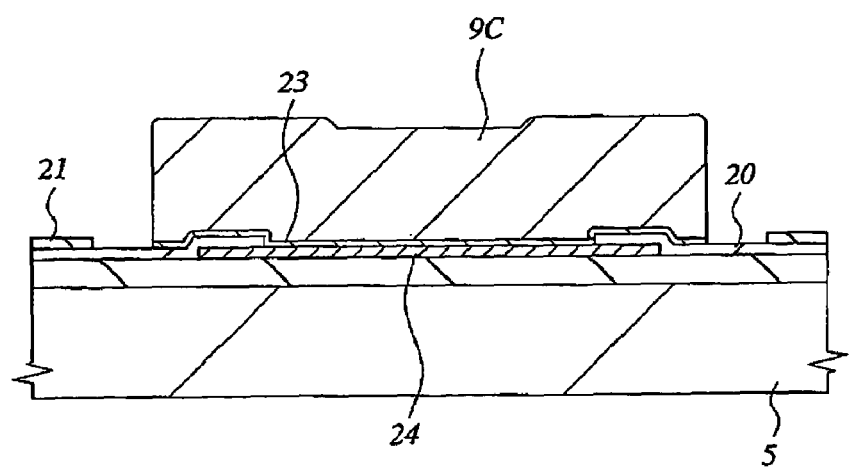
FIG. 13 is a cross-sectional view of a dummy bump electrode formed on the main surface of the chip shown in FIG. 11 and a portion near the bump electrode.
Figure 14:
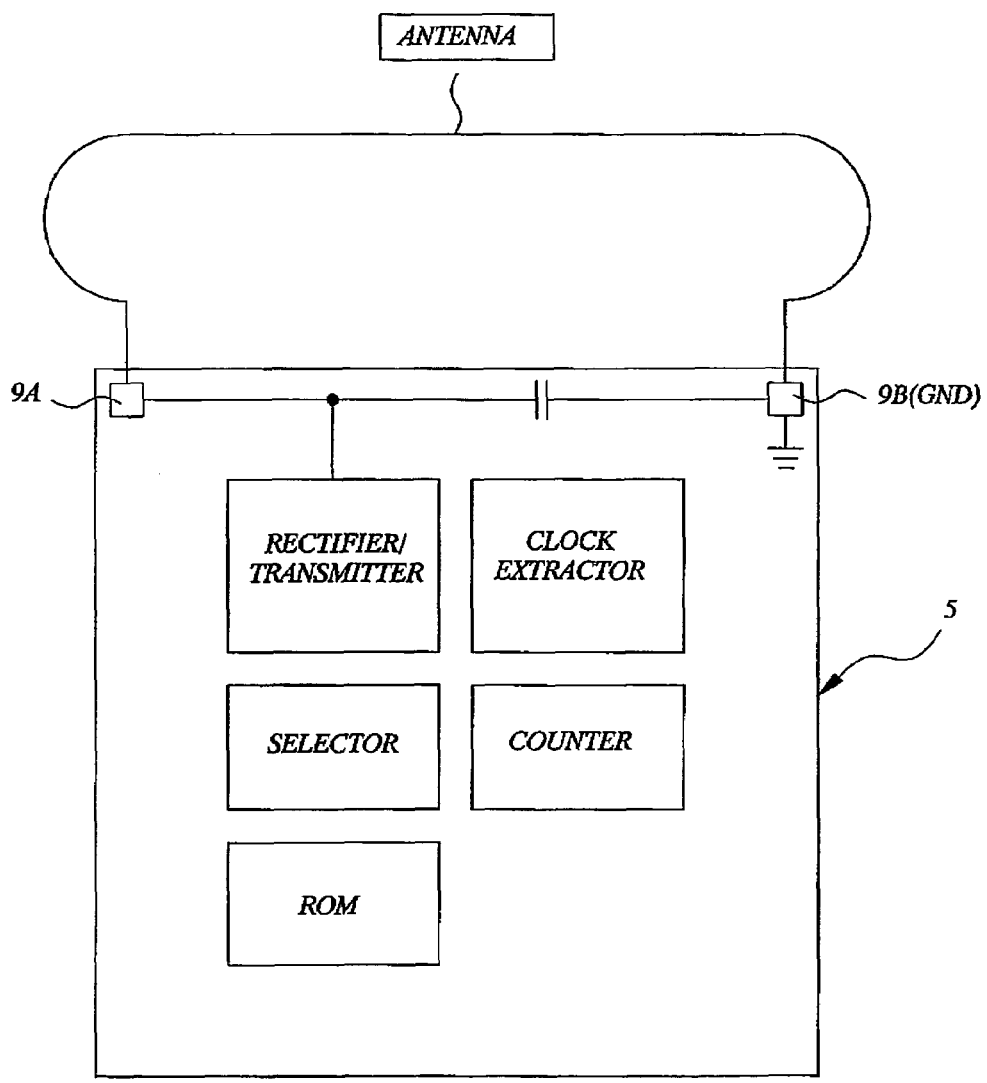
FIG. 14 is a block diagram of a circuit formed on the main surface of the chip shown in FIG. 11.

FIG. 11 is a plan view showing a layout of four Au bumps 9A, 9B, 9C and 9D formed on the main surface of the chip 5, FIG. 12 is an enlarged cross-sectional view of a portion near the Au bump 9A, FIG. 13 is an enlarged cross-sectional view of a portion near the Au bump 9C, and FIG. 14 is a block diagram of a circuit formed in the chip 5.

The chip 5 is composed of, for example, a single-crystal silicon substrate with a thickness of about 0.15 mm, and a circuit composed of a rectifier/transmitter, a clock extractor, a selector, a counter, a ROM (storage element) and the like as shown in FIG. 14 is formed on a main surface of the chip 5. The ROM has a storage capacity of 128 bits and can store a larger capacity of data in comparison with the storage medium such as the bar code or the like. Further, the data stored in the ROM has an advantage that an unfair interpolation is difficult in comparison with the data stored in the bar code.

Four Au bumps 9A, 9B, 9C and 9D are formed on the main surface of the chip 5 in which the above-described circuit is formed. These four Au bumps 9A, 9B, 9C and 9D are positioned on a pair of virtual diagonal lines shown by a two-dot chain line in FIG. 11 and are laid out in such a manner that distances from an intersection point of the diagonal lines (center of the main surface of the chip 5) are approximately equal. These Au bumps 9A, 9B, 9C and 9D are formed by using, for example, an electrolytic plating method, and a height thereof is, for example, about 15 µm.

Note that the layout of the Au bumps 9A, 9B, 9C and 9D is not limited to the layout shown in FIG. 11. However, it is preferable to employ a layout by which a balance is easily secured with respect to a load at the time of connecting the chip. For example, it is preferable to dispose the Au bumps so that a polygon formed by tangential lines of the Au bumps in a plane layout surrounds the center of the chip.

Of these four Au bumps 9A, 9B, 9C and 9D, for example, the Au bump 9A forms an input terminal of the circuit shown in FIG. 14, and the Au bump 9B forms a GND terminal. Further, the remaining two Au bumps 9C and 9D form dummy bumps, which are not connected to the circuit mentioned above.

As shown in FIG. 12, the Au bump 9A constituting the input terminal of the circuit is formed on a top layer metal wiring 22 which is exposed by etching a passivation film 20 covering the main surface of the chip 5 and a polyimide resin 21. Further, a barrier metal film 23 for improving an adhesion force is formed between the Au bump 9A and the top layer metal wiring 22. The passivation film 20 is composed of, for example, a laminated film of a silicon oxide film and a silicon nitride film, and the top layer metal wiring 22 is composed of, for example, an Al alloy film. Further, the barrier metal film 23 is composed of, for example, a laminated film of a Ti film having a high adhesion force to the Al alloy film and a Pd film having a high adhesion force to the Au bump 9A. Although an illustration thereof is omitted, a connection portion between the Au bump 9B constituting the GND terminal of the circuit and the top layer metal wiring 22 has the same structure as mentioned above. On the other hand, as shown in FIG. 13, the Au bump 9C (and 9D) constituting the dummy bump is connected to a metal layer 24 formed in the same wiring layer as the top layer metal wiring 22. However, the metal layer 24 is not connected to the circuit mentioned above.

Figure 15:
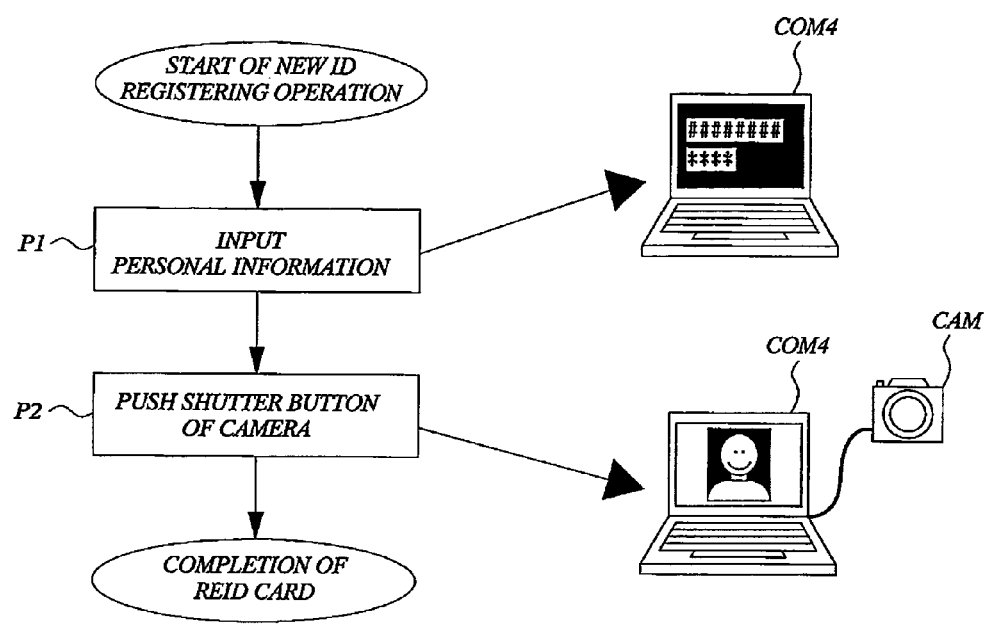
FIG. 15 is an explanatory view showing the process of issuing an RFID card IDC in an RFID card issuing system according to one embodiment of the present invention.
Figure 16:
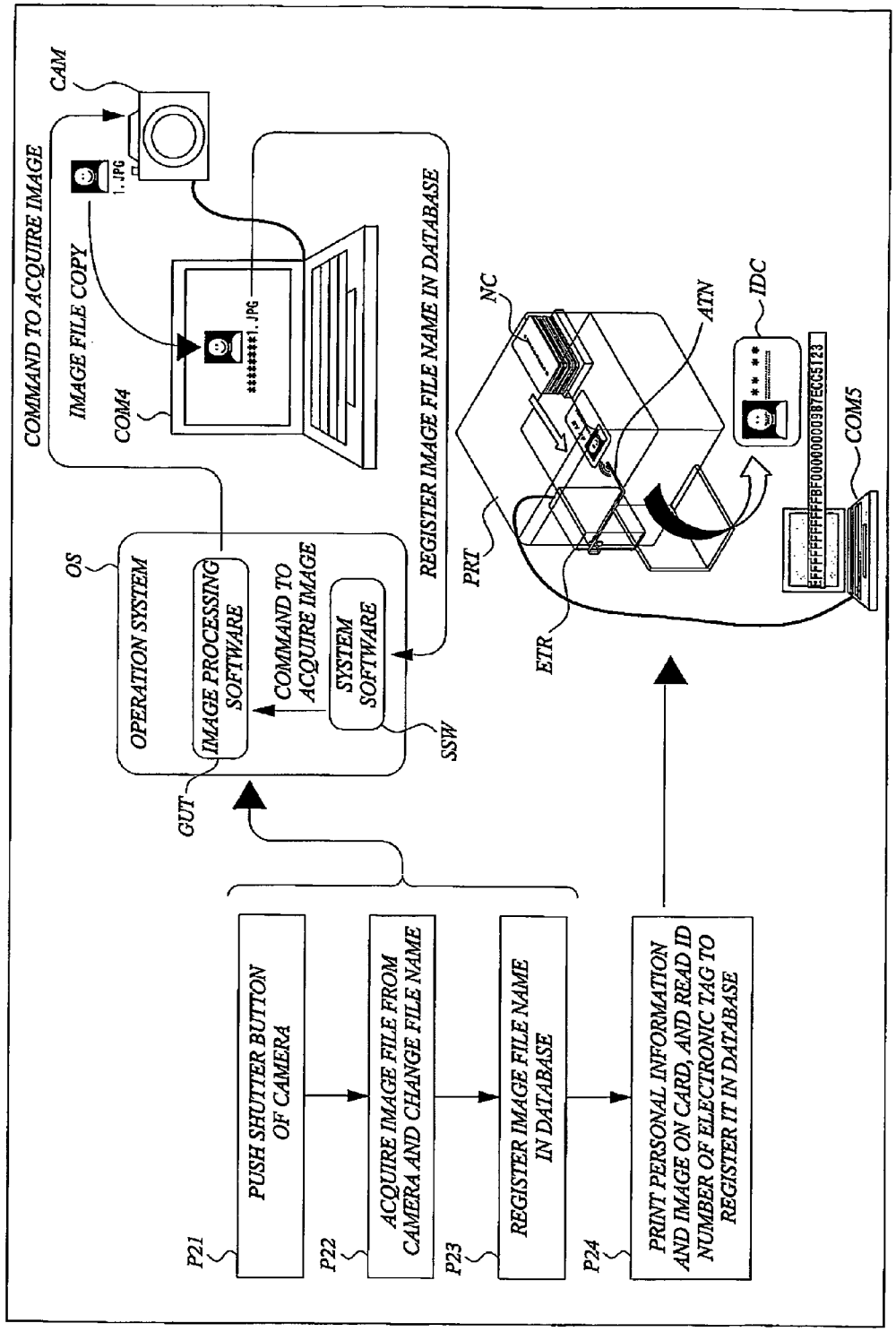
FIG. 16 is an explanatory view showing a part of the process shown in FIG. 15 in more detail.

FIG. 15 is an explanatory view showing the process of issuing the RFID card IDC (refer to FIG. 2 and FIG. 3) by the RFID card issuing system shown in FIG. 1, and FIG. 16 is an explanatory view showing a part of the issuing process in more detail, in which the process until the RFID card is completed after pushing a shutter button of a camera is shown.

In the process for issuing the RFID card, first, personal data such as an affiliation, an employee number, a name and the like of the RFID card holder is inputted to the RFID card issuing computer COM4 (step P1). The computer COM4 is included in the RFID card issuing system CIS. The inputted personal information is registered in the database in the server computer SVR (refer to FIG. 1). At the time of inputting the personal information, the personal information may be directly input from a keyboard (data input means) of the computer COM4, or the personal information may be optically read from a business card on which the personal information is described, by using a scanner (data input means) or the like.

Next, a photograph of a person to be the card holder is taken by a camera (photographing means) CAM which is electrically connected to the computer COM4 and can exchange the data (step P2). In this embodiment, the camera CAM can be exemplified by a digital camera which can take a digital photograph and a Web camera which is remote controlled by the computer. COM4. By always displaying the image caught by a finder of the camera CAM on a screen of the computer COM4, a shutter button of the camera CAM can be pushed at a suitable timing.

In the RFID card issuing process in this embodiment, manual operation steps are only the steps P1 and P2. Accordingly, since it is possible to largely reduce the number of the manual operation steps, it is possible to execute an issuing operation of the RFID card by a person who is not accustomed to handling the computer. Further, since the number of the manual operations is small such as only the steps P1 and P2 mentioned above, it is possible to largely reduce the time required for issuing the RFID card.

The steps P1 and P2 mentioned above can be executed by the person to be the card holder or by a person other than the person to be the card holder such as an operator who is staffed to handle the operation.

Next, a process executed by the RFID card issuing system CIS in the step P2 mentioned above will be described in more detail.

In this embodiment, the process steps executed by the RFID card issuing system are managed and controlled by system software SSW activated on an operation system OS.

First, the shutter button of the camera CAM is pushed to take the photograph of the person to be the card holder (step P21). Then, the system software SSW detects that the shutter button of the camera CAM is pushed, and issues a command to image processing software GUT to acquire an image file (image data) of the photograph. Similar to the system software SSW, the image processing software GUT is also activated on the operation system OS. In this manner, the image processing software GUT executes a process of copying the image file into a predetermined folder formed in a disk drive (date storing means) of the computer COM4 from the camera CAM. At this time, the image processing software GUT changes a file name of the image file copied to the computer COM4 to a file name suitable for the registration and management in the database (step P22). Subsequently, the image processing software GUT registers the changed file name in the database in the server computer SVR (refer to FIG. 1), and associates the file name of the image file with the personal information of the person to be the RFID card holder which has already been registered (step P23).

When the system software SSW detects that the step P23 is finished, it issues a command to a printer (card printing means) PRT to print the image file registered in the database in the step P23 and the personal information associated with the image file on the database on the main surface of the new card NC. The new card NC is previously set in the printer PRT or at a position capable of being supplied to the printer PRT. Further, the inlet 1 described with reference to FIG. 2 and FIG. 3 is previously stuck to a rear surface of the new card NC.

When the printer PRT receives the printing command from the system software SSW, the printer PRT starts printing the image file and the personal information onto the main surface of the new card NC. In this case, the printer PRT is provided with an electronic tag reader ETR therein, and the electronic tag reader ETR reads the ID number from the inlet 1 stuck to the rear surface of the new card NC by the antenna (ID number reading means) ATN during the printing process to the main surface of the new card NC. In this embodiment, the ID number can be exemplified by, for example, 128 bit data which is represented by a hexadecimal thirty-two digits. The electronic tag reader ETR is connected via a line to the computer COM5, and the ID number read by the electronic tag reader ETR is sent to the computer COM5. The computer COM5 registers the received ID number in the database in the computer SVR (refer to FIG. 1) and associates the ID number with the personal information and the image file of the person to be the RFID card holder which have already been registered (step P24). When the printing process on the main surface of the new card NC is finished, the RFID card mentioned above is completed.

In the steps P21 to P24, the manual operation is only pushing the shutter button of the camera, and all the other operations are executed by a software control without relying on the manual operation. Accordingly, it is possible to largely reduce the time required for issuing the RFID card IDC. In accordance with an experiment executed by the inventor of the present invention, it takes about two minutes to issue one RFID card IDC in the case where this embodiment is applied despite that it has taken about ten minutes or more in the case where the steps P21 to P24 are executed through manual operations.

Further, according to this embodiment, since the various data is also registered in the database by the software, it is possible to prevent an input error, a mistake of the date stored position, a mistake in the process of associating various data on the database resulting from the manual operation.

Further, according to this embodiment, the ID number is acquired during the printing process onto the main surface of the new card NC and registered in the database, and the ID number is associated with the image file and the personal information of the person to be the RFID card holder. Therefore, it is possible to prevent the trouble that the ID number is associated with an improper image file and personal information.

Figure 17:
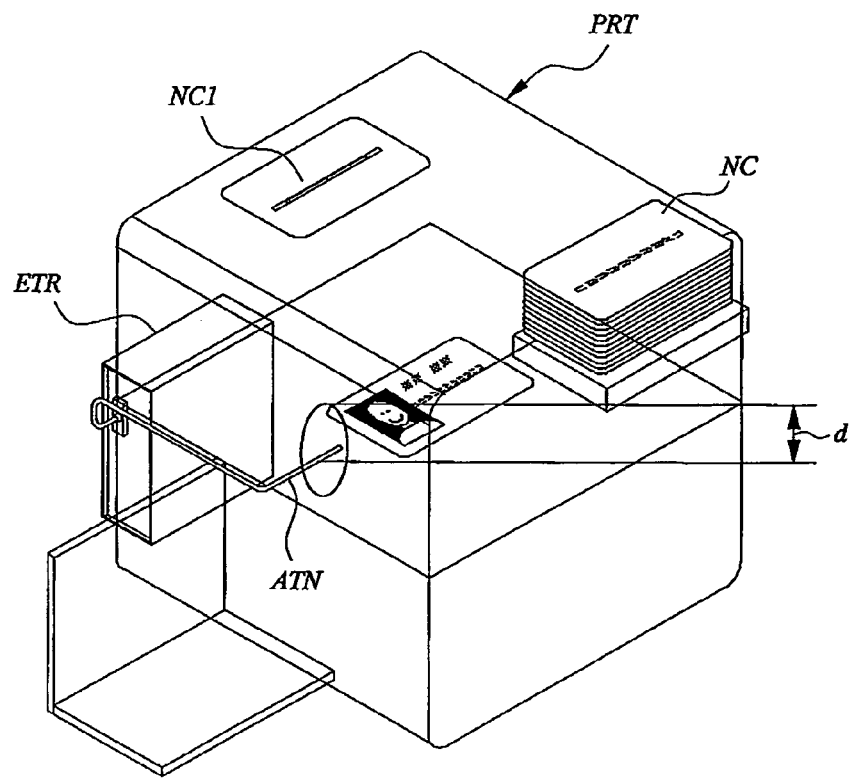
FIG. 17 is a perspective view of a printer included in the RFID card issuing system according to one embodiment of the present invention.

Next, the printer PRT according to this embodiment will be described in more detail. FIG. 17 is a perspective view of the printer PRT.

As mentioned above, the printer PRT is provided with the electronic tag reader ETR therein, and the electronic tag reader ETR reads the ID number from the inlet 1 stuck to the rear surface of the new card NC by the antenna ATN during the printing process. In this embodiment, the antenna ATN can be exemplified by a small dipole antenna or monopole antenna with a communication distance d of about 3 cm in radius. Also, the antenna ATN is disposed so that the antenna ATN is positioned at a distance within about 3 cm from the inlet 1 during the printing process.

If a one-patch type antenna is used instead of the antenna ATN mentioned above, the antenna itself becomes large in size. Accordingly, it is difficult to install the antenna in the printer PRT. Further, the communication distance of the one-patch type antenna becomes long, namely, about 20 cm. Accordingly, if the new card NC1 on which the printing error or the like occurs is left on the printer, there is a risk that the ID number is erroneously read from the new card NC1 on which the printing error or the like occurs.

On the other hand, since the antenna ATN itself can be reduced in size by employing the antenna ATN according to this embodiment, it is possible to install the antenna ATN in the printer PRT. Further, since the communication distance of the antenna ATN is short, namely, 3 cm in radius, the communication range does not reach the printer even if the new card NC1 on which the printing error or the like occurs is left on the printer. Accordingly, it is possible to prevent the problem that the ID number is erroneously read from the new card NC1 on which the printing error or the like occurs.

Figure 18:
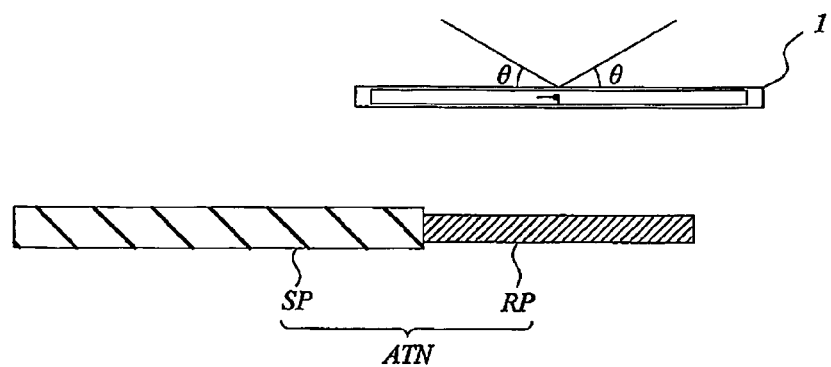
FIG. 18 is a plan view of a main portion of an antenna disposed in the printer shown in FIG. 17.

FIG. 18 is a plan view of a main portion of the antenna ATN mentioned above.

As shown in FIG. 18, the antenna ATN is formed of, for example, a receiving portion RP receiving the electric wave from the inlet 1 and a shielding portion SP shielding the electric wave from outside, and is a wire antenna formed of a coaxial cable with a diameter of about 2 mm in the shielding portion SP. Since the antenna ATN can receive the electric wave sent from the inlet 1 at the time when an extending direction of the inlet 1 and an extending direction of the receiving portion RP are in a parallel positional relationship, the new card NC is previously set to the printer PRT in such a manner that the extending direction of the inlet 1 and the extending direction of the receiving portion RP become in parallel at the time of the printing process. Further, the antenna ATN can receive the electric wave sent from the inlet 1 even if the extending direction of the inlet 1 is inclined at about a predetermined angle θ from the position in parallel to the extending direction of the receiving portion RP, and the angle θ is about 30 degrees or less, and preferably about 20 degrees or less.

Figure 19:
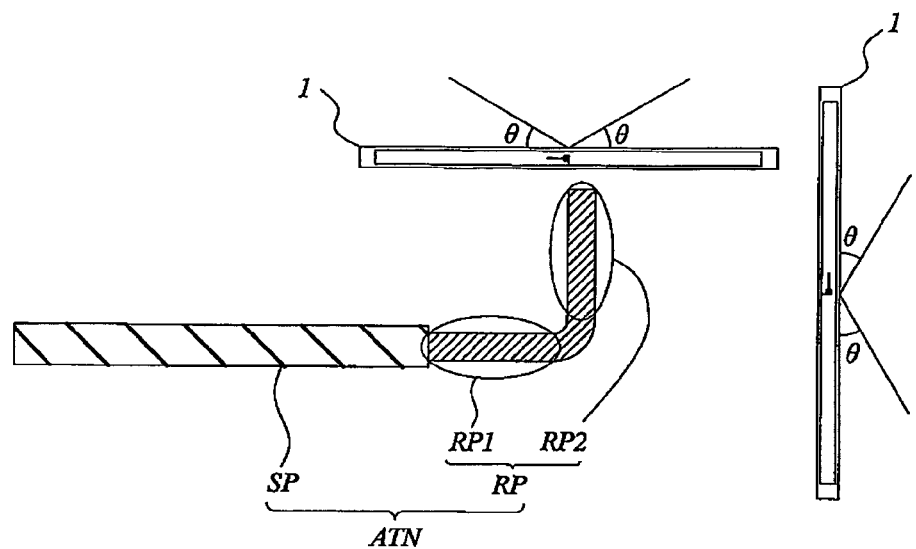
FIG. 19 is a plan view of a main portion of the antenna disposed in the printer shown in FIG. 17.

Further, as shown in FIG. 19, the receiving portion RP may have a structure such as that bent at about 90 degrees at the middle portion thereof, and may be composed of a receiving portion RP1 and a receiving portion RP2 which is in an approximately vertical (intersecting) positional relation to the receiving portion RP1. With the structure of the receiving portion RP mentioned above, the electric wave sent from the inlet 1 can be received by the receiving portion RP1 or the receiving portion RP2 regardless of the extending direction of the inlet 1. Accordingly, the printer PRT can handle the printing of plural kinds of RFID cards IDC. As a result, since versatility of the printer PRT can be improved, it is possible to reduce a cost required for issuing the RFID card IDC.

Further, since the antenna ATN has a structure composed of the coaxial cable shown in FIG. 18 and FIG. 19, it is possible to simplify the structure of the antenna ATN. Accordingly, it is possible to reduce a manufacturing cost of the antenna ATN. In other words, it is possible to reduce the cost required for issuing the RFID card IDC.

Figure 20:
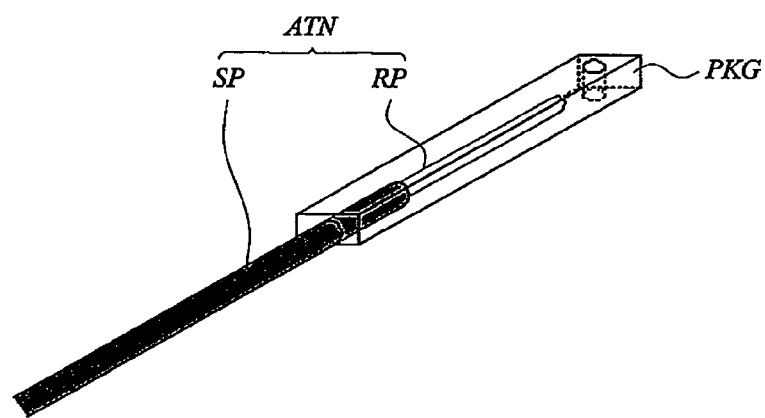
FIG. 20 is a perspective view of a main portion for describing an example of a packaging of a receiving portion in the antenna shown in FIG. 18.
Figure 21:
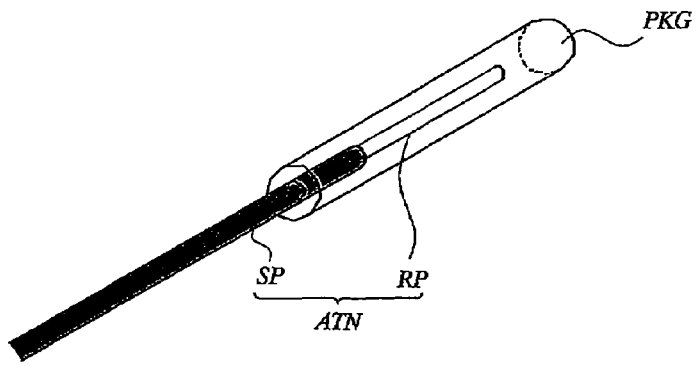
FIG. 21 is a perspective view of a main portion for describing an example of the packaging of the receiving portion in the antenna shown in FIG. 18.
Figure 22:
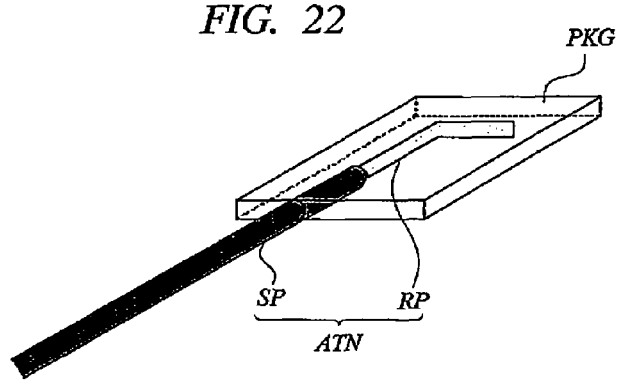
FIG. 22 is a perspective view of a main portion for describing an example of a packaging of a receiving portion in the antenna shown in FIG. 19.
Figure 23:
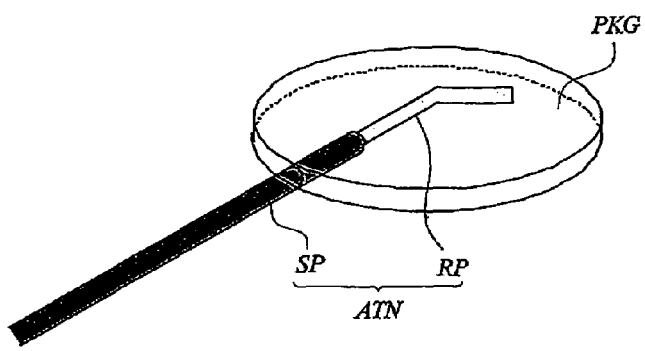
FIG. 23 is a perspective view of a main portion for explaining an example of the packaging of the receiving portion in the antenna shown in FIG. 19.

FIG. 20 to FIG. 23 are perspective views of a main portion for describing an example of a packaging of the receiving portion RP of the antenna ATN, in which FIG. 20 and FIG. 21 show a structure relative to the antenna ATN shown in FIG. 18, and FIG. 22 and FIG. 23 show a structure relative to the antenna ATN shown in FIG. 19.

It is necessary that a periphery of the receiving portion RP of the antenna ATN is covered with a packaging PKG made of an insulating material, for example, a plastic or the like in order to be insulated from outside. An outer shape of the packaging PKG can be exemplified by a square pole shape as shown in FIG. 20 and FIG. 22, a circular cylinder shape as shown in FIG. 21 and FIG. 23, and the like. Further, materials other than the plastic may be used for the packaging PKG as long as they do not influence the electric wave environment.

In the foregoing, the invention made by the inventors of the present invention has been concretely described based on the embodiments. However, it is needless to say that the present invention is not limited to the foregoing embodiments and various modifications and alterations can be made within the scope of the present invention.

In the embodiment mentioned above, the case where a plurality of computers are provided for each intended use has been described. However, the configuration in which one computer functions as all or some of the computers is also available.

INDUSTRIAL APPLICABILITY

The RFID card issuing system according to the present invention can be applied to the issuing of the RFID card which is used in, for example, the locking management, the time card management, the entry and exit management or the like.

What is claimed is:

1. An RFID card issuing system comprising: data input means; data storing means; photographing means; ID number reading means; a database; system software; image processing software; and card printing means provided with an RFID card in which an electronic tag is previously stuck to a rear surface and executing a printing to a main surface of said RFID card, said system performing:

(a) a step of inputting personal information of a person whose personal information is registered in said database by said data input means, and registering said personal information in said database by said system software;

(b) a step of acquiring an image data by taking a photograph of said person by said photographing means, thereafter acquiring said image data in a folder which stores said image data and is provided in said data storing means by driving said image processing software by means of said system software, applying a predetermined file name to said image data, registering said file name in said database, and associating said file name with said personal information;

(c) a step of reading said personal information of said person and said file name of said image data from said database by said system software to send said personal information and said file name to said printing means, printing said personal information and said image data on said main surface of said RFID card by said printing means, and issuing said RFID card; and (d) a step of reading an ID number of said electronic tag from said electronic tag on said rear surface of said RFID card by said ID number reading means, registering said ID number in said database by said system software, and associating said ID number with said file name and said personal information.

2. The RFID card issuing system according to claim 1, wherein said step (d) is executed during the execution of said step (c).

3. The RFID card issuing system according to claim 1, wherein said ID number reading means is provided in said printing means.

4. The RFID card issuing system according to claim 1, wherein a communication distance of said ID number reading means is 3 cm or shorter.

5. The RFID card issuing system according to claim 4, wherein said ID number reading means is a wire antenna.

6. The RFID card issuing system according to claim 5, wherein a receiving portion of said ID number reading means includes a first region extending in parallel to an extending direction of said electronic tag during said step (c), and a second region extending in a direction intersecting said extending direction of said electronic tag.

7. The RFID card issuing system according to claim 1, wherein said electronic tag includes a read-only storage element.

* * * * *

UNITED STATES PATENT AND TRADEMARK OFFICE
CERTIFICATE OF CORRECTION

PATENT NO. : 7,387,233 B2  Page 1 of 1
APPLICATION NO. : 10/560524
DATED : June 17, 2008
INVENTOR(S) : T. Matsuta et al.

It is certified that error appears in the above-identified patent and that said Letters Patent is hereby corrected as shown below:

On title page

Item (22):   PCT Filed:

Please delete "Dec. 12, 2004" and insert --Dec. 14, 2004--

Signed and Sealed this

Seventh Day of October, 2008

JON W. DUDAS
*Director of the United States Patent and Trademark Office*